March 24, 1959

E. E. RANKIN, JR 2,879,403

SYSTEM FOR RADIOACTIVE LOGGING

Filed Nov. 13, 1956

INVENTOR.
EDWARD E. RANKIN JR.,

BY *James M. Peppers*

AGENT.

March 24, 1959

E. E. RANKIN, JR 2,879,403

SYSTEM FOR RADIOACTIVE LOGGING

Filed Nov. 13, 1956

*INVENTOR.*
EDWARD E. RANKIN JR.

BY

AGENT.

United States Patent Office 2,879,403
Patented Mar. 24, 1959

2,879,403

SYSTEM FOR RADIOACTIVE LOGGING

Edward E. Rankin, Jr., Houston, Tex., assignor, by mesne assignments, to Welex, Inc., a corporation of Delaware Application November 13, 1956, Serial No. 621,704

9 Claims. (Cl. 250—83.6)

This invention generally relates to the radioactive surveying of earth formations traversed by a well bore and more particularly relates to a system for providing more accurate detection and definition of various strata of said formation.

The surveying of earth formations by detection of the radioactivity of said formations is presently well known and in widespread use. Such surveying is generally accomplished by passing a radiation detection device through a well bore and recording the relative radioactivity of each stratum passed by the detector. The most commonly used radiation detector is a counter of the Geiger-Mueller type which, when properly quenched, creates a relatively intense current of very short duration. Such current usually flows through a resistance and the voltage drop across said resistance is amplified and transferred to the earth's surface as a discrete pulse. Thus the number of such pulses received at the earth's surface, during a definite time interval, will give an indication of the radioactivity of each formation stratum.

Usually such pulses are integrated into a direct current voltage and the amplitude of such voltage is recorded as a function of the formation radioactivity. Thus, assuming such a detector to be stationary in a well bore and emitting pulses at an average rate in response to the radioactivity of an adjacent formation stratum, the minimum required time constant would be that sufficient to produce a constant direct current voltage in response to such pulses. This time constant would need be sufficiently long to smooth such voltage variation due to the random nature and statistical variation of the pulses thus detected. If the time constant were less than this minimum, the recorded radioactivity of such stratum would be erratic even though the detector were stationary.

Now, if the detector were moving at a constant speed past the adjacent formation, it is known that an optimum time constant must be established which would be long enough to smooth out this statistical variation but also which would be short enough to minimize distortion of the recorded radioactive variation of the formations thus traversed.

In the logging of such formations, particularly when detection of thin strata is desired, a distortion due to long time constants, i.e., the time lag introduced in the change of recorded radioactivity, is of considerable importance. Upon analyzing such recorded formation distortions, as logged by radiation detection systems, it was found that, with a fixed time constant of integration, this distortion increases with logging speed. Thus, with a long time constant and a high logging speed, it is easily seen that it would be possible to pass through a thin stratum without recording its presence.

It is therefore seen that a particular time constant must be provided for each logging speed to attain optimum recorded logs of traversed strata. If the time constant is long with respect to the logging speed there will be undue distortion in the recording of the relative depth thickness of various strata. If the time constant is very short in relation to the logging speed, the random nature of the received pulses may result in records too erratic for proper interpretation. In past practice the common procedure has been to establish an optimum time constant in relation to a constant predetermined logging speed such that a recorded curve of maximum accuracy and smoothness would be recorded during the logging of a well bore. Of course, this has made necessary the passing of the detector throughout the length of the bore hole at a constant speed which, though optimum for particular zones of interest, was unnecessarily slow for the remainder of the bore hole.

The relative location of the principal zones of interest of a well bore are usually known, due to surrounding wells, well cores, and electric logs. Such zones are the only zones which are usually desired to be logged in detail, and the remainder of the well bore may be logged only as a correlative measure. It is therefore seen that, though this constant slow speed is desirable through such zones of interest, a faster logging speed would be desirable to log the remainder of the well bore.

It is therefore the general objects of this invention to provide a system for logging a well bore at various convenient logging speeds and yet obtain an optimum log for accurately defining the thickness, depth and relative radioactivity of various strata.

In accordance with the present invention there is provided a well logging system having a gamma ray detection means, means of amplifying the output of said detection means for transmission to the earth's surface, a means of integrating such detection means output to a direct current voltage, means to vary the integrating time constant of said integrating means in direct response to the logging speed of said gamma ray detector means through a well bore, and means to record said direct current voltage in proportion to the depth of the detection means within the well.

A more complete understanding of this invention in all its details may be obtained by consideration of the attached drawing in view of the following specific description.

Figure 1:
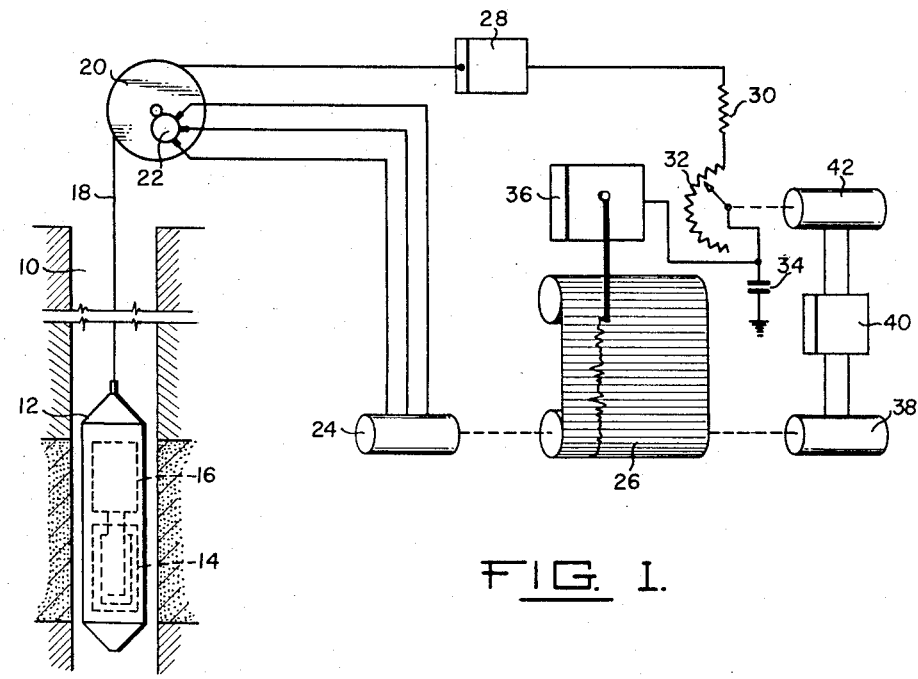
Figure 1 is a schematic illustration of one preferred embodiment of the invention.

Now, referring to the drawing in detail, and first to Figure 1, there is illustrated a radiation detection tool 12 supported in a well bore 10 by a cable 18. Housed within tool 12 is a gamma ray detector 14, herein exampled as one of the Geiger-Mueller type, connected into a suitable quenching and amplifying circuit 16. Cable 18 is adapted to be wound about a sheave 20 to raise and lower tool 12 in well bore 10. Hoisting apparatus (not shown) is provided to reel in cable 18 and thus adjust the travel of tool 12 to any speed desired. Geared to sheave 20 is a speed transmitting device 22, herein exampled and referred to as a "Selsyn" transmitter. Transmitter 22 is electrically connected to a "Selsyn" receiver 24. Receiver 24 is in turn connected mechanically to a logging chart 26 in such manner that the logging chart will move past a recording pen at a speed directly proportional to the speed of detection tool 12 in well bore 10.

Amplifier 16 is electrically connected through cable 18 into a pulse shaping circuit 28. The purpose of circuit 28 is to detect each pulse emanating from amplifier 16, and to generate a pulse of constant amplitude and duration in response to said detected pulse. Circuit 28 is connected through a resistor 30, a variable resistor 32 and a capacitor 34 to ground. Resistor 30, variable resistor 32 and capacitor 34 comprise a resistance-capacitance (RC) integrating circuit the time constant of which is adapted to be varied by adjustment of resistor 32. The output of said RC circuit (the junction of resistor 32 and capacitor 34) is connected into a recorder pen drive 36 which is adapted to drive a pen across logging chart 26.

Figure 3:
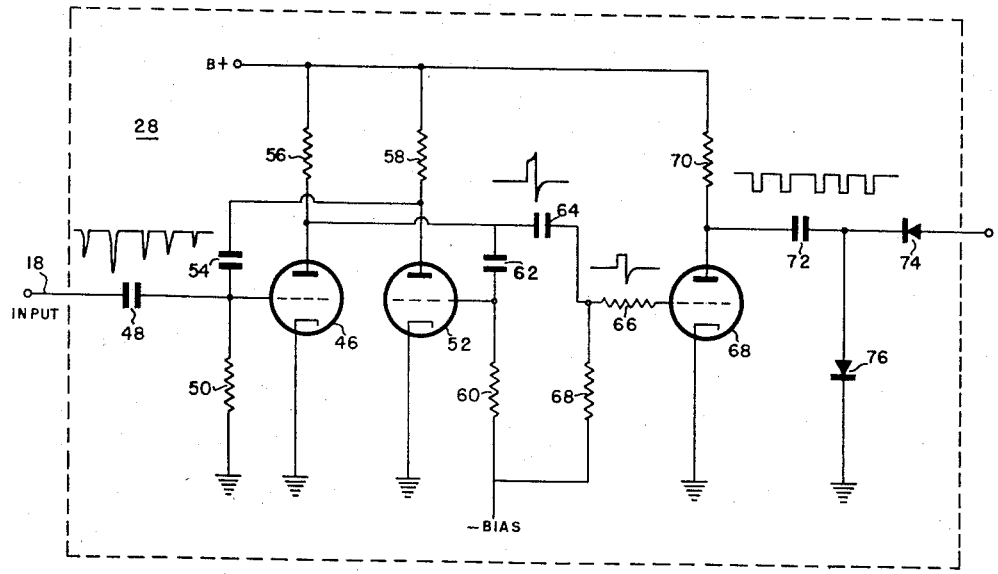
Figure 3 is a schematic illustration of a preferred pulse shaping circuit 28 as provided in Figure 1.

A preferred pulse shaping circuit 28 embodiment is illustrated in detail in Figure 3. As illustrated, pulses emanating from amplifier 16 through cable 18 are received on the grid of a triode vacuum tube 46 through a capacitor 48. Triode 46 grid is also connected to the ground through a resistor 50 and to the plate of a second vacuum tube 52 through a capacitor 54. The cathodes of both triodes 46 and 52 are respectively connected to ground. The plate of triode 46 is connected through a resistor 56 to a B+ voltage source. The plate of triode 52 is also connected through a resistor 58 to said B+ source. The grid of triode 52 is connected through a resistor 60 to a negative bias voltage and through a capacitor 62 to the plate of triode 46. The plate of triode 46 is also connected through a capacitor 64 and a resistor 66 to the grid of a triode 68. Triode 68 grid is connected through resistor 66 and a resistor 68 to said negative bias voltage. The plate of triode 68 is connected through a resistor 70 to said B+ source and the cathode of triode 68 is connected to ground. Triode 68 plate is also connected through a capacitor 72 and a rectifier 74 to the previously described RC integrating circuit and through capacitor 72 and a rectifier 76 to ground.

Shaping circuit 28 operates in the following manner. Each pulse received through cable 18 and capacitor 48 lowers the voltage on the grid of normally conducting triode 46, thus initially reducing the current flow therethrough. A curve illustrating such pulse is shown above capacitor 48. The plate voltage of triode 46 then increases, reducing the negative grid bias of triode 52. Reduction of the negative grid bias of triode 52 initially causes current flow therethrough, reducing the plate voltage of said triode. This reduced voltage is fed through capacitor 54 back to the grid of triode 46, which further reduces the current flow through said triode. After these described voltage changes are initiated, this action continues full cycle until such time as triode 46 ceases to conduct and triode 52 is conducting to saturation. At this time triode 46 grid returns to normal, permitting current to again flow through said triode. The plate voltage of triode 46 thereon diminishes, allowing the negative grid bias voltage to return to triode 52. During this cycle the voltage found on triode 46 plate and transmitted through the capacitor 64 and resistor 66 to the grid of triode 68 is of positive value during a definite time interval then slightly negative before returning to normal. This plate voltage variation is generally illustrated by the curve appearing above capacitor 64. It is pointed out that the positive swing of this voltage is of definite time variation determined by the values of capacitor 62 and resistor 60 and also of capacitor 54 and resistor 50. This voltage, upon passing through resistor 66, appears on the grid of triode 68 as a voltage generally illustrated by the curve shown above resistor 66. It is seen that the positive swing of such voltage has been sharply clipped at a relatively low amplitude; this being caused by grid conduction of triode 68 and the resulting voltage drop caused thereby across resistor 66. As this initial positive voltage is placed on the grid of triode 68, the triode conducts and its plate voltage drop passes through capacitor 72 and rectifier 74 to the previously described RC circuit. The shape of such voltage drops are generally illustrated by the curve shown above rectifier 74. This plate voltage is also adapted to pass through capacitor 72 to rectifier 76 which purpose, in combination with rectifier 74, is to permit the voltage to reach said RC circuit as a negative pulse with a zero base rather than a negative pulse alternating with a positive base.

Variable resistor 32 is mechanically connected to and adapted to be adjusted by a servo motor 42. Servo motor 42 is connected to and positioned by a controlling servo amplifier 40. Servo amplifier 40 controls servo motor 42 in response to a voltage produced by a speed indicator 38 connected thereto, said speed indicator 38 being herein exampled as a direct current voltage generator. Speed indicator 38 is mechanically connected to chart 26 by suitable gearing of desirable ratio. The arrangement is such that any change in speed of tool 12 in well bore 10 will effect a corresponding adjustment to variable resistor 32.

Figure 4:
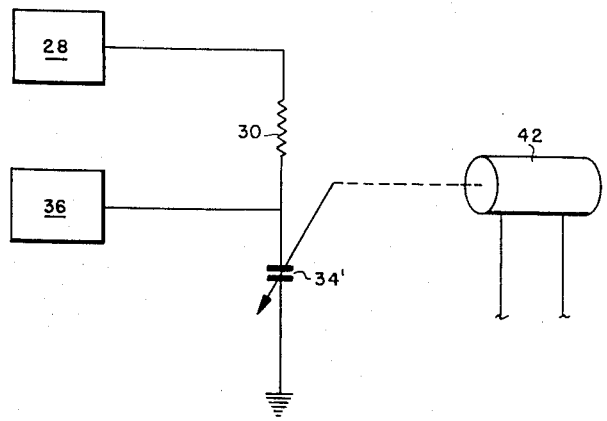
Figure 4 is a schematic illustration of an alternate embodiment of the resistance-capacitance circuit disclosed in Figure 1.

It is pointed out that the resistance variation of variable resistor 32 is not the only means of changing the time constant of the RC circuit. Variation of the capacitance of capacitor 34 may also serve to vary such time constant. Hence, as shown in Figure 4, it is foreseen that servo motor 42 may be provided to position a variable capacitor 34' rather than a variable resistor 32, if desired for applicable circumstances.

As shown, pulses from circuit 28 pass through a resistor 30 of constant resistance to be stored on the plates of a variable capacitor 34'. Capacitor 34' is mechanically connected to servo motor 42 and adapted to be adjusted by said servo motor, as illustrated in Figure 4. The voltage appearing between resistor 30 and capacitor 34' is connected into a recorder pen drive 36, as is also illustrated in Figure 4.

It is also pointed out that generator 38, servo amplifier 40 and servo motor 42 are well known and commercially available devices. Their use as herein illustrated might be substituted by other equally effective means. An example of such means would be to provide a spring loaded mechanical flyball governor in geared relation to chart drive 26 and have said governor effect adjustment of variable resistor 32 in response to speed variation thereof. Or, another example would be to provide speed transmitter 22 to actuate a second receiver similar to receiver 24, said second receiver then being adapted to drive generator 38 or the previously described mechanical governor.

It is further pointed out that tool 12, as herein illustrated, is of a type suitable for detecting the natural gamma radiation of the well bore formation. The invention herein described also would be of equal utility if tool 12 contained a neutron source and detected the neutron induced gamma radiation. It is also foreseen that two detection circuits, such as that herein described, could be so provided as to be housed in the same tool 12, one detecting the natural gamma radiation, the other detecting the induced gamma radiation, and thus record two separate records on logging chart 26.

In operation, tool 12 is usually lowered to the bottom of a well bore and the logging record is made as the tool is brought up to the surface of the earth. Detector 14, upon being presented to successive adjacent strata, is discharged in response to each discrete quantum of gamma radiation emanating from each stratum. Thus, while passing through a particular stratum, detector 14 will be discharged at a rate commensurate with the radioactive decay of such formation. Each discharge of detector 14 is amplified and transmitted through cable 18 to circuit 28 in the form of a discrete pulse. Circuit 28 transforms each pulse received thereto into a corresponding pulse which is of constant amplitude and duration. The pulse output from circuit 28 feeds through resistor 30 and variable resistor 32, creating a direct circuit current voltage at capacitor 34. This direct current voltage will vary in amplitude responsive to the received pulse rate and vary at a rate determined by the effective resistance of resistor 30 and variable resistor 32. Pen drive 36 is controlled by said direct current voltage whereupon a record is made indicating the radioactivity of each stratum traversed by the well bore 10.

When in operation as described, it may be seen that, at low logging speeds, long time constants may be employed which results in a smooth, well defined log. However, at a higher logging speed, with such long time constants, the general character of the log would change, introducing considerable distortion in the indication of individual formation stratum. If, however, the time constant is varied in inverse proportion to the logging speed, the general character of the optimum log would remain constant, and through introducing a higher statistical variation, would still give accurate definition of each stratum.

To accomplish this variation in time constant, servo motor 42 adjusts the effective resistance of the previously described RC circuit. Then, as a new logging speed is established for detector 12, transmitter 22 drives receiver 24, chart drive 26, and in turn generator 28 at a new proportionate speed. Servo amplifier 40, in response to the new voltage level established by generator 38, repositions servo motor 42, thus establishing a new adjustment of variable resistor 32.

It may now be seen that detector 12 may be passed through the zones of interest in well bore 10 at a low speed to give accurate character and little or no statistical variation to a recorded log. Then, the remainder of the well bore may be logged at a much higher speed and still give a correspondingly similar character to a recorded log even though a small amount of statistical anomaly will occur in said log.

It is pointed out that the radiation detector herein described as that of a Geiger-Mueller type could also be of other types and be provided in the present invention. Another example would be a radiation detector of the ionization chamber type. When an ionization chamber is provided the current variation through said chamber which may be picked up as a voltage across a high resistance and this voltage variation be integrated in a manner similar to that described herein. When a detector of this type is used the equipment and circuitry necessary to transmit such voltage variation is generally known and presently used and need not be described herein in detail.

Figure 2:
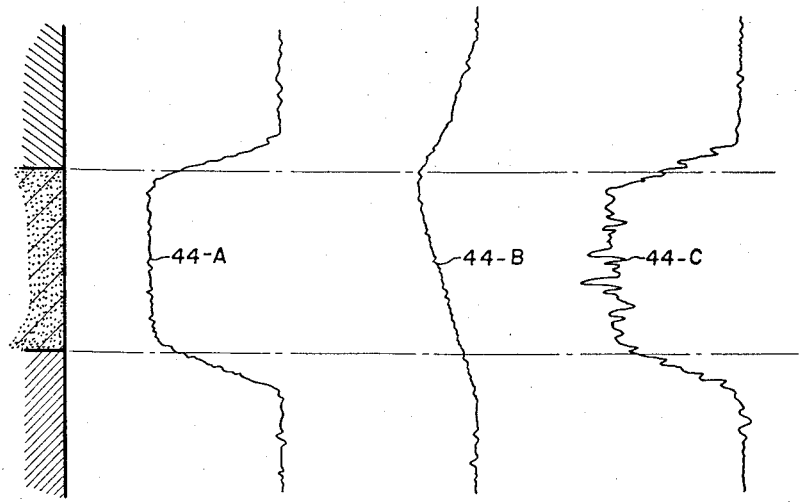
Figure 2 illustrates typical comparative recorded curves of the detected radioactivity of one stratum of a well formation both with and without the use of this invention.

Now referring to Figure 2, there is illustrated a curve 44A depicting the radiation record of a particular formation stratum when recorded at a low logging speed and corresponding long time constant. Curve 44B illustrates the recording of the same stratum with the logging speed increased, but with the time constant remaining the same. It is seen that at a faster logging speed, distortion of the curve is much more pronounced and presence of the stratum is much less definite. It can easily be seen that, at fast logging speed and thin formations, the record might fail to indicate such stratum at all.

Now, referring to the curve 44C, the formation has been logged at the same speed as was used in recording curve 44B. However, the time constant was changed in proportion to the logging speed by provision of the invention herein described. It is obvious that, though statistical anomalies are present in 44C, the general character of said curve is in close proximation to curve 44A and defines the presence of the particular stratum in a far superior manner than does curve 44B.

It is obvious that other modifications and variations of the invention, as herein described and set forth, may be made without departing from the spirit and scope of said invention, and, therefore, the scope of the invention is to be indicated by the appending claims.

That which is claimed is:

1. A radioactivity well logging system comprizing, gamma ray detection means adapted for movement through a well bore, signal transmission means in connection from said detection means to a signal integrating means having a variable time constant, time constant adjustment means to detect the speed of said detection means and adjust the time constant of said integration means in direct proportion to said speed, and means to detect an integrated signal from said integrating means in direct relation to the position of said detection means within said well bore.

2. The system of claim 1 wherein said signal integrating means is a resistance-capacitance circuit of time constant varied by change of resistance in response to said time constant adjustment means.

3. The system of claim 1 wherein said signal integrating means is a resistance-capacitance circuit of time constant varied by change of capacitance in response to said time constant adjustment means.

4. The system of claim 1 wherein said time constant adjustment means includes an actuator to vary the time constant of said integrating means by change of position and a speed sensing element coupled to said detection means to position said actuator in response to the speed of said detection means.

5. The system of claim 4 wherein said signal integrating means is a resistance-capacitance circuit of time constant varied by change of resistance in response to said time constant adjustment means.

6. The system of claim 4 wherein said signal integrating means is a resistance-capacitance circuit of time constant varied by change of capacitance in response to said time constant adjustment means.

7. A radioactivity well logging system comprizing, a radiation detection means adapted to be moved through a well bore at varied speeds, means to transmit signals from said detection means to a signal integrating means of variable time constant, time constant adjustment means to adjust the time constant of said integrating means in direct response to the speed of said detection means through said well bore, said adjustment means including a servo motor to vary said time constant by change of position, a servo amplifier to position said motor in response to variation of a speed indicator coupled to detect the speed of said detection means, and means in connection with said integrating means to detect an integrated signal in direct relation to the depth of said detection means in said well bore.

8. The system of claim 7 wherein said signal integration means is a resistance-capacitance circuit of time constant varied by change of resistance in response to said time constant adjustment means.

9. The system of claim 7 wherein said signal integration means is a resistance-capacitance circuit of time constant varied by change of capacitance in response to said time constant means.

References Cited in the file of this patent

UNITED STATES PATENTS

| | | |
|---|---|---|
| 2,638,273 | Jensen et al. | May 12, 1953 |
| 2,659,014 | Scherbatskoy | Nov. 10, 1953 |
| 2,692,339 | Franklin | Oct. 19, 1954 |